US00RE35016E

United States Patent [19]

Gullman et al.

[11] E Patent Number: Re. 35,016

[45] Reissued Date of Patent: Aug. 15, 1995

[54] THREE-AXIS FORCE MEASUREMENT STYLUS

[75] Inventors: Larry S. Gullman, La Honda; Roy Kornbluh, Palo Alto; Thomas P. Low, La Honda, all of Calif.; Peter M. Newgard, Rainier, Wash.; Eric J. Shrader, La Honda, Calif.

[73] Assignee: SRI International, Inc., Menlo Park, Calif.

[21] Appl. No.: 831,257

[22] Filed: Jan. 30, 1992

Related U.S. Patent Documents

Reissue of:

[64] Patent No.: 4,896,543
Issued: Jan. 30, 1990
Appl. No.: 271,254
Filed: Nov. 15, 1988

[51] Int. Cl.[6] ..... G01L 5/16; G06K 9/00

[52] U.S. Cl. ..... 73/862.041; 73/862.043; 73/865.4; 382/119; 401/194; 345/179

[58] Field of Search ..... 73/862.043, 862.042, 73/862.044, 862.045, 862.046, 862.05, 862.041, 862.541, 865.4, 862.06; 382/3; 401/194

[56] References Cited

U.S. PATENT DOCUMENTS

| | | | |
|---|---|---|---|
| Re. 29,765 | 9/1978 | Crane et al. | 73/432 R |
| 3,906,444 | 9/1975 | Crane et al. | 340/146.3 SY |
| 3,986,403 | 10/1976 | Hurd et al. | 73/432 R |
| 4,111,052 | 9/1978 | Sniderman | 73/432 R |
| 4,646,351 | 2/1987 | Asbo et al. | 382/3 |
| 4,793,193 | 12/1988 | Borgudd | 73/862.04 |
| 5,018,208 | 5/1991 | Gladstone | 73/865.4 |

*Primary Examiner*—Herbert Goldstein
*Attorney, Agent, or Firm*—Townsend and Townsend Khourie and Crew

[57] ABSTRACT

A three-axis force measurement stylus includes a housing and a cartridge and an interface between the housing and the cartridge wherein the interface comprises a plurality of pressure sensitive sheets, preferably of variable resistance pressure sensitive Mylar films which sense the force between the cartridge and the housing. The cartridge and the housings are disposed at a skew angle relative to the axis of the stylus to be able to sense forces in three dimensions. In a specific embodiment, the cartridge forms a conical section which mates with a complimentary conical section of the housing. Membranes of the force sensitive material are provided along three fingers from an apex of the conical section. The cartridge is preloaded against the conical section by a spring between the housing and the cartridge. Alternatively to the force sensitive film, a sheet of a piezoelectric pressure-sensitive material may be substituted. In each instance, direct pressure between the conical section of the cartridge and the conical section of the housing is sensed by the sensor mounted therebetween.

23 Claims, 2 Drawing Sheets

THREE-AXIS FORCE MEASUREMENT STYLUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a stylus or writing instrument which generates electrical signals representative of the force applied in the direction of motion taken in writing. A particular application of the apparatus is for use as a computer input device wherein the forces sensed by the stylus are used for recognizing ciphers, selecting colors, or establishing line widths and densities of lines. The apparatus can also be used in connection with signature analysis. Still further, the apparatus may be used in connection with a tablet or sensing x-y position for various applications related to graphics and computer aided design.

2. Description of Prior Art

The prior art of force-sensitive stylae is represented by inventions described in for example, U.S. Pat. Nos. Re. 29,765 to Crane et al. entitled "Strain Gauge Transducer System," 4,111,052 to Sniderman entitled "Pressure-Sensitive Writing Stylus," 3,986,403 to Hurd et al. entitled "Writing Instrument Employing Adjustable Housing carrying Strain Gage and Removable Reservoir"and 3,906,444 to Crane et al. entitled "Special Pen and System for Handwriting Recognition."

The Crane et al. reissue patent discloses a strain gauge based transducer system employing a diaphragm on which strain gauges are mounted. The strain gauges in accordance with standard strain gauge technology produce a signal proportional to the stretching of the sensor with the deformation of the diaphragm. The Sniderman reference discloses a pressure sensitive pen employing a thin film strain gauge array in connection with a elongated tubular member. The strain in tubular member in sensed and translated into a signal representative of pressure along the axis of the pen.

In addition, a pen is marketed by Summagraphics in connection with its graphics technology which employs a force sensitive film mounted at the end of a tube to sense change of pressure along the axis of the tube with a stylus. A user's manual for the Summagraphics pen describes its relevant features.

What is needed is a stylus which can be inexpensively manufactured and yet sense pressure in multiple axes at the tip of the stylus. What is also needed is a stylus of sufficiently rugged construction to withstand the riggers of heavy and abusive use.

SUMMARY OF THE INVENTION

According to the invention, a three-axis force measurement stylus comprises a housing and a cartridge and an interface between the housing and the cartridge wherein the interface comprises a plurality of pressure sensitive sheets, preferably of variable resistance pressure sensitive Mylar films which sense the force between the cartridge and the housing. The cartridge and the housing are disposed at a skew angle relative to the axis of the stylus to be able to sense forces in three dimensions. In a specific embodiment, the cartridge forms a conical section which mates with a complimentary conical section of the housing. Membranes of the force sensitive material are provided along three fingers from an apex of the conical section. The cartridge is preloaded against the conical section by a spring between the housing and the cartridge. Alternatively to the force sensitive film, a sheet of a piezoelectric pressure-sensitive material may be substituted. In each instance, direct pressure between the conical section of the cartridge and the conical section of the housing is sensed by the sensor mounted therebetween.

The invention will be better understood by reference to the following detailed description in connection with the accompanying drawings.

DESCRIPTION OF SPECIFIC EMBODIMENTS

Figure 1:
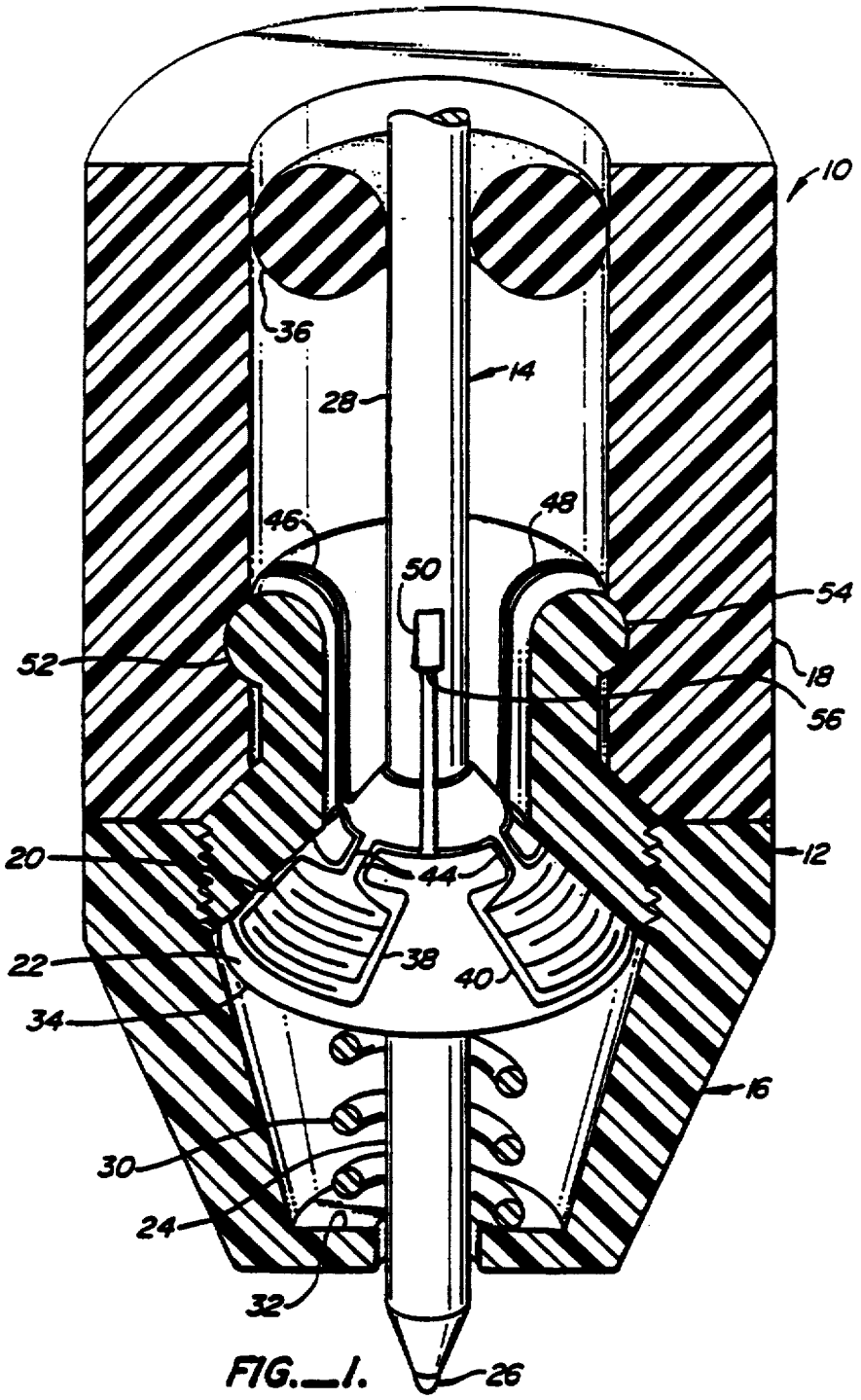
FIG. 1 is a side view of the stylus with a partial cross-section of the housing.

Referring to FIG. 1, there is shown a stylus 10 comprising a housing 12 and a pick-up 14. The housing 12 comprises a tip cover 16, a barrel 18 and a pressure funnel 20.

The pick-up 14 comprises a pressure cone 22 juxtaposed to pressure funnel 20 and a cartridge 24, such as a standard ball point pen cartridge having a tip 26 and a shaft 28. The pick up 14 is biased against the housing 12 by means of a preloading spring 30, such as a coil spring disposed between the inner wall 32 of the tip cover 16 and the back 34 of the pressure cone 22, thereby forcing the pressure cone 22 against the surface of the pressure funnel 20. A suitable elastomeric O-ring 36 is disposed between barrel 18 and the shaft 28 to provide a degree of flexibility to the shaft 28 within the barrel 18.

Figure 2:
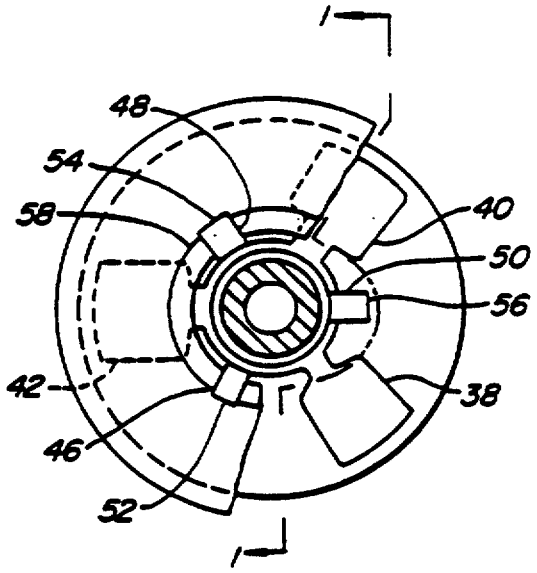
FIG. 2 is a view along the axis of the stylus along the axis of the stylus.

Referring to FIG. 2 in connection with FIG. 1, there are a plurality of sensors 38, 40 and 42 distributed around the central axis of the pressure cone 22 such that they rest in juxtaposition between the pressure cone 22 and the pressure funnel 20. The sensors 38, 40 and 42 comprise pads having interconnections 44 (not shown in FIG. 2) between active sensing areas in the pads to fingers 46, 48, 50, which terminate in connectors 52, 54, 56, to suitable electronic processing circuitry. In a specific embodiment of the invention, the fingers are held in place by a pressure interface between the barrel 18 and a tube portion 58 of the pressure funnel 20.

In operation, a user grasps the stylus 10 to apply pressure to the tip 26 which in turn transmits the pressure to the interface between the pressure cone 22 and the pressure funnel 20. The sensors 38, 40 and 42 detect the pressure upon the pad surface between the face of the funnel 20 and the cone 22, there typically being a differential pressure depending on the direction and amount of pressure at the tip 26. The resultant pressure is transformed into a change in conductance through the interconnections 44 which can be measured through appropriate circuitry connected at the connectors 52, 54 and 56. A suitable signal processing can be used to interpret the variations in conductance and provide a suitable output signal or sequence of signals to a suitable utilization device.

Figure 3:
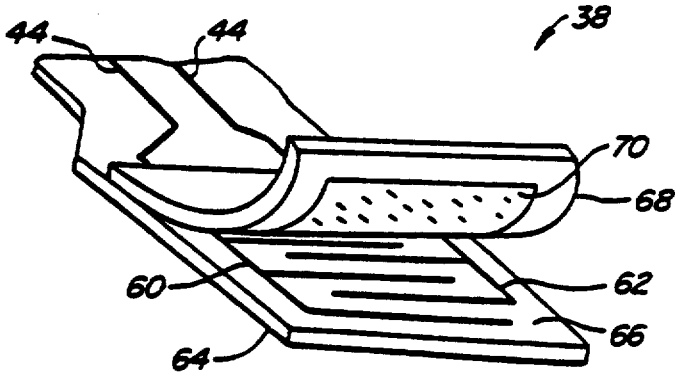
FIG. 3 is a peel-away of one of the pressure sensitive sensors used in connection with the invention.

FIG. 3 is an illustration of one specific embodiment of a suitable sensor 38 for use in accordance with the invention. The sensor 38 has two interconnections 44, each of which is connected to one set of trace 60 and 62 which are intersticed on the surface of a suitable elastomeric film 64. Juxtaposed to the surface 66 of the elastomeric film bearing the traces 60 and 62 is a second elastomeric film 68 having on its facing surface is a coating 70 of a suitable conductive material. Conductivity varies directly with pressure. A suitable pad having the appropriate coating is manufactured by Interlink of Santa Barbara, Calif.

The sensors for use in accordance with the invention have the advantage of relative ease and economy of manufacture, making it possible to provide a stylus of potentially low-cost and high-volume production. In addition, the stylus employing sensors in accordance with the invention can be made to be extremely rugged because of the inherent reliability of parts as well as their resistance to abuse and environmental factors.

Alternatively, piezoelectric transducers may be used for pressure sensing, however, these are not preferred for two reasons. First, piezoelectric transducers may be constructed of brittle material which could be broken. However, some piezoelectric transducers are known which are composed of extremely thin material on a pliant backing. Second, piezoelectric transducers generally generate a signal only under changing conditions. Thus, they do not generate a steady state signal directly proportional to pressure. Hence, a sensor capable of generating a signal directly proportional to pressure is preferred for applications contemplated for the invention.

The invention has now been explained with reference to specific embodiments. Other embodiments will be apparent to those of ordinary skill in the art. Therefore, it is not intended that this invention be limited, except as indicated by the appended claims.

I claim:

1. An apparatus for generating signals representing direction and magnitude of force on a shaft in a stylus comprising:

a housing, wherein said housing comprises a funnel portion;

a pickup *coupled to said shaft*, wherein said pickup comprises a cone portion; and means disposed between said housing and said pickup and abutting said housing and said pickup at an interface skewed from said shaft for sensing pressure between said housing and said pickup in a plurality of directions wherein said sensing means further comprises a first pad, a second pad and a third pad constructed on a common elastomeric backing material, each said pad including at least a pair of conductive traces having a surface exposed for electrical connection thereto and a coating of conductive material over said traces, said conductive material being in contact with said traces varying conductivity between said traces in proportion to pressure between said coating and said traces.

2. The apparatus according to claim 1 wherein said pickup further comprises an ink-carrying cartridge, said cartridge being removably mounted to said cone portion.

3. The apparatus according to claim 2 further including means for biasing said funnel portion against said cone portion.

4. The apparatus according to claim 1 further including means for biasing said funnel portion against said cone portion.

5. An apparatus for generating signals representing direction and magnitude of force on a shaft in a stylus comprising:

a housing, wherein said housing comprises a funnel portion;

a pickup *coupled to said shaft*, wherein said pickup comprises a cone portion; and means disposed between said housing and said pickup and abutting said housing and said pickup at an interface skewed from said shaft for sensing pressure between said housing and said pickup in a plurality of directions, wherein said funnel portion and said cone abut one another in a complementary relationship forming said interface, and wherein said sensing means comprises planar pads which are disposed at said interface between said funnel portion and said cone portion and which are distributed around a central axis through said cone portion for sensing directionality of force.

6. The apparatus according to claim 5 wherein said pickup further comprises an ink-carrying cartridge, said cartridge being removably mounted to said cone portion.

7. The apparatus according to claim 6 further including means for biasing said funnel portion against said cone portion.

8. The apparatus according to claim 5 further including means for biasing said funnel portion against said cone portion.

9. An apparatus for generating signals representing direction and magnitude of force on a shaft in a stylus comprising:

a housing, wherein said housing comprises a first pressure means;

a pickup *coupled to said shaft*, wherein said pickup comprises a second pressure means; and a sensing means disposed between said housing and said pickup and abutting said housing and said pickup at an interface wherein said first and second pressure means exert pressure on said sensing means for sensing pressure of said pickup abutting said housing in a plurality of directions wherein said first pressure means comprises a funnel portion and wherein said second pressure means comprises a cone portion, said cone portion abutting said funnel portion in a complementary relationship forming said interface, and wherein said sensing means comprises planar pads which are disposed at said interface between said funnel portion and said cone portion and which are distributed around a central axis through said cone portion for sensing directionality of force.

10. The apparatus according to claim 9, wherein said sensing means further comprises a first pad, a second pad and a third pad constructed on a common elastomeric backing material, each said pad including at least a pair of conductive traces having a surface exposed for electrical connection thereto and a coating or conductive material over said traces, said conductive material being in contact with said traces varying conductivity between said traces in proportion to pressure between said coating and said traces.

11. The apparatus according to claim 10, wherein said pickup further comprises an ink-carrying cartridge, said cartridge being removably mounted to said cone portion.

12. The apparatus according to claim 11, further including means for biasing said funnel portion against said cone portion.

13. The apparatus according to claim 10, further including means for biasing said funnel portion against said cone portion.

14. The apparatus according to claim 9, wherein said pickup further comprises an ink-carrying cartridge, said cartridge being removably mounted to said cone portion.

15. The apparatus according to claim 14, further including means for biasing said funnel portion against said cone portion.

16. The apparatus according to claim 9, further including means for biasing said funnel portion against said cone portion.

*17. A stylus comprising:*

*a) a pickup, said pickup coupled to a shaft;*

*b) a housing for holding said pickup; and*

*c) a sensor connected to and between said pickup and said housing, said pickup comprising a funnel portion and a cone portion, said funnel portion and said cone portion defining a substantially common vertex, each of said cone portion and said funnel portion defining interfaces skewed from an axis of said pickup, said sensor further comprising:*

*i) a first substantially planar pad;*

*ii) a second substantially planar pad; and*

*iii) a third substantially planar pad, each of said pads varying a conductivity in proportion to pressure between said coating and said traces when pressure is applied to said shaft in said stylus.*

*18. The stylus as recited in claim 17 wherein said pads each further comprise a conductive trace having an exposed surface for electrical connection thereto, and a coating of conductive material over said traces, said conductive material varying said conductivity.*

*19. The stylus as recited in claim 17 wherein said pickup comprises an ink cartridge.*

*20. Apparatus for generating signals representing direction and magnitude of force on a shaft in a stylus comprising:*

*a) a housing, wherein said housing comprises a funnel portion;*

*b) a pickup coupled to said shaft, wherein said pickup comprises a cone portion, said funnel portion and said cone portion defining a substantially common vertex, each of said funnel portion and cone portion defining abutting interfaces skewed from a central axis of said pickup; and*

*c) means disposed between said housing and said pickup for sensing pressure between said housing and said pickup when pressure is applied to said shaft in said stylus.*

*21. Apparatus as recited in claim 20 wherein said means for sensing comprises at least three planar pads arranged between said funnel portion and said cone portion.*

*22. Apparatus as recited in claim 20 wherein said pickup further comprises an ink-carrying cartridge, said cartridge removably mounted to said cone position.*

*23. Apparatus as recited in claim 20 further comprising means for biasing said funnel portion against said cone portion.*

* * * * *